(12) United States Patent
Mujica et al.

(10) Patent No.: US 7,023,929 B2
(45) Date of Patent: Apr. 4, 2006

(54) DIGITAL PRE-COMPENSATION FILTER FOR DMT TYPE TRANSMITTER

(75) Inventors: Fernando A. Mujica, Allen, TX (US); Udayan Dasgupta, Irving, TX (US); Mangesh Sadafale, Nagpur (IN); Sandeep Oswal, Bangalore (IN); Prakash Easwaran, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 779 days.

(21) Appl. No.: 10/191,994

(22) Filed: Jul. 10, 2002

(65) Prior Publication Data

US 2004/0008793 A1    Jan. 15, 2004

(51) Int. Cl.
*H04K 1/10*    (2006.01)

(52) U.S. Cl. .................. 375/260; 375/222; 375/296; 375/298; 375/350; 370/210

(58) Field of Classification Search ............ 375/260, 375/222, 296, 298, 350; 370/210
See application file for complete search history.

(56) References Cited

U.S. PATENT DOCUMENTS

| | | | |
|---|---|---|---|
| 6,097,776 A * | 8/2000 | Mesiwala | 375/355 |
| 6,535,552 B1 * | 3/2003 | Pessoa | 375/231 |
| 6,788,725 B1 * | 9/2004 | Aoyagi et al. | 372/102 |
| 6,940,807 B1 * | 9/2005 | Rezvani et al. | 370/210 |

* cited by examiner

*Primary Examiner*—Stephen Chin
*Assistant Examiner*—Ted M. Wang
(74) *Attorney, Agent, or Firm*—W. James Brady, III; Frederick J. Telecky, Jr.

(57) ABSTRACT

A method of providing an improved transfer function for a Discrete Multitone (DMT) type modulation transmitter with digital filtering after modulation followed by digital to analog converter and analog filtering is provided by sending a test signal to said transmitter and measuring the results of the test signal to determine the transfer function. The inverse of the transfer function that needs to be compensated is determined and the inverse of transfer function to be compensated is truncated to the region of interest ($H_2$). The desired band split component of pre-compensation filter is designed ($H_3$). The desired target frequency response of the pre-compensation filter is determined by $H_4=H_2*H_3$ where $H_4$ is the multiplication of $H_2$ and $H_3$ Given the target frequency response in $H_4$ Hermetian symmetry is imposed on the frequency response. The inverse Fourier transform (IFFT) is taken to generate a time domain filter, $h_5$. The characteristic of this filter is added at the digital filtering after modulation.

19 Claims, 7 Drawing Sheets

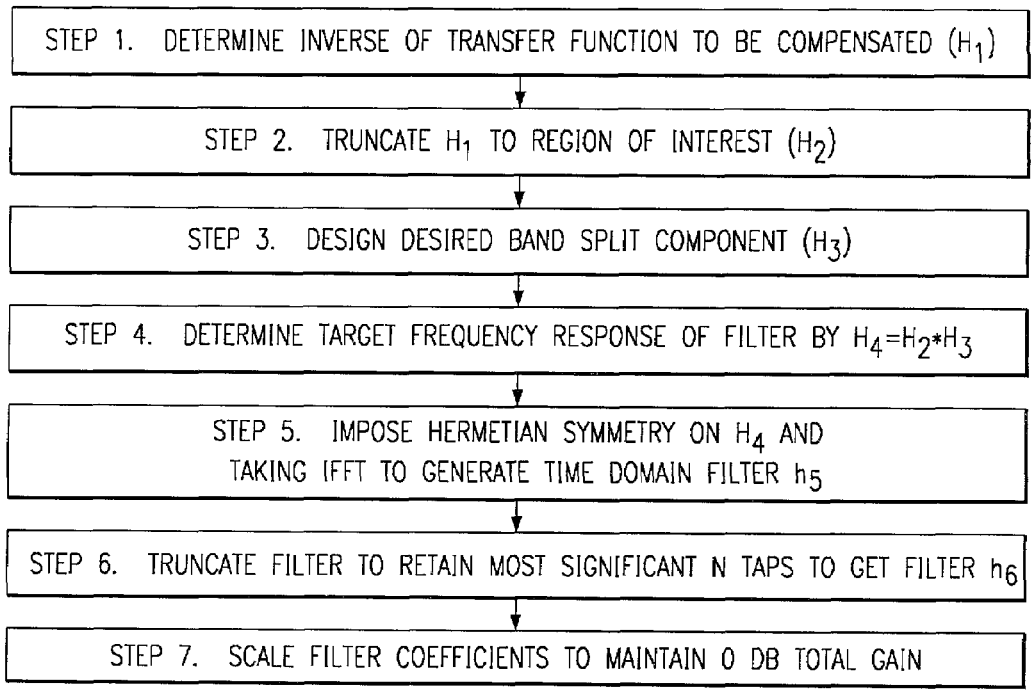

FIG. 5

STEP 1. DETERMINE INVERSE OF TRANSFER FUNCTION TO BE COMPENSATED ($H_1$)

STEP 2. TRUNCATE $H_1$ TO REGION OF INTEREST ($H_2$)

STEP 3. DESIGN DESIRED BAND SPLIT COMPONENT ($H_3$)

STEP 4. DETERMINE TARGET FREQUENCY RESPONSE OF FILTER BY $H_4 = H_2 * H_3$

STEP 5. IMPOSE HERMETIAN SYMMETRY ON $H_4$ AND TAKING IFFT TO GENERATE TIME DOMAIN FILTER $h_5$

STEP 6. TRUNCATE FILTER TO RETAIN MOST SIGNIFICANT N TAPS TO GET FILTER $h_6$

STEP 7. SCALE FILTER COEFFICIENTS TO MAINTAIN 0 DB TOTAL GAIN

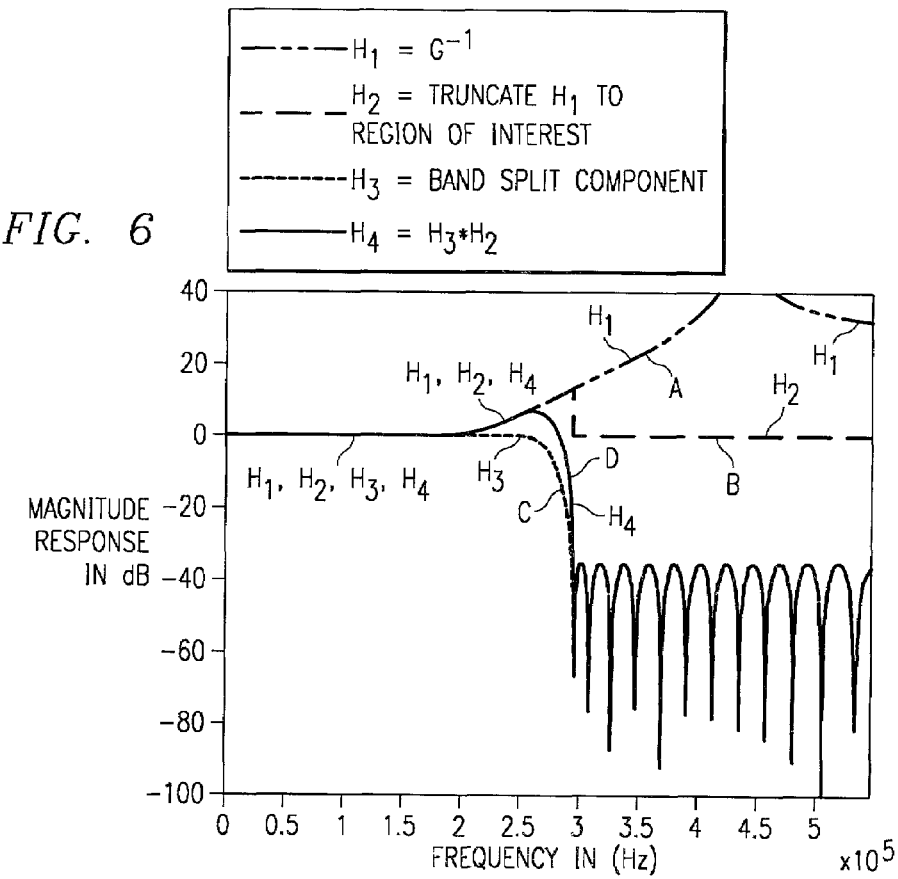

FIG. 6

DIGITAL PRE-COMPENSATION FILTER FOR DMT TYPE TRANSMITTER

FIELD OF INVENTION

This invention relates to digital pre-compensation filtering and more particularly to digital pre-compensation filtering for a transmitter using Discrete Multitone Modulation (DMT) type transmitter.

BACKGROUND OF INVENTION

In an Asymmetrical Digital Subscriber Lines (ADSL) the data is encoded into constellation points by multiple (one for each carrier) constellation encoders. A typical ADSL system uses DMT based modulation. Another term for this type of modulation system is referred to as Orthogonal Frequency Division Multiplexing (OFDM) system. The complex values of the constellation encoder outputs are the inputs to an inverse fast Fourier transform (IFFT). A typical ADSL transmitter 10 after modulation uses several stages of digital filtering 12 followed by digital to analog conversion (DAC) 13, one or more stages of analog filtering 15, line driver 16 and analog front end 17 including hybrid 18 connected to the line as shown in FIG. 1. At the receiver, the reverse process is performed; i.e., the received signal is amplified and filtered prior to analog to digital conversion, further processed by digital filters and a FFT is used to recover the carriers. In the receiver the multiple carriers are then demodulated in multiple constellation decoders (one for each carrier), recovering the original data.

At the transmitter after modulation (after IFFT, cyclic prefix addition, etc. 11), the digital filtering 12 typically consists of several interpolation filters to match the digital to analog converter (DAC) 13 sampling rate. Apart from interpolation, these filters perform most of the spectral shaping to comply with a given Power Spectral Density (PSD) mask. A PSD mask is a template that specifies the maximum PSD allowable for a line code. PSD masks are used as both guidelines for the design and implementation of a DSL technology as well as for crosstalk modeling to simulate and benchmark performance. In addition, for a frequency division duplexing (FDD) system, these filters also perform the band split. The analog filtering 15 following the DAC 13 provides the desired out-of-band attenuation for transmit noise while the line driver adjusts the transmit power to adhere to a desired total transmit power.

All analog and digital filters have a finite amount of pass-band ripple and/or group delay distortion associated with them. The analog front-end (transformer, coupling capacitors, etc.) and the impedance mismatch between the hybrid and the line (channel) may also distort the signal. Also the amplitude/phase response of the analog filters are sensitive to process variations and hence the actual hardware can vary slightly from the nominal values and also between chip to chip. Moreover in certain ADSL codec designs, significant analog power/area savings and/or improved noise performance may be achieved by reducing the amount of analog filtering in the transmitter. Another advantage of reducing the analog filtering is that the group delay distortion in the transmit path may also be reduced. To do this and yet achieve a given stop band attenuation, the analog filter may have to cut into the upper part of the transmit spectrum. All of these could reduce upstream rates and/or make equalization of the upstream channel difficult.

SUMMARY OF INVENTION

In accordance with one embodiment of the present invention a way to overcome the issues and achieve a flat pass-band response, despite such effects, is to use a digital pre-compensation filter. Such a filter is designed to pre-distort the signal to ensure that the resultant signal, after passing through the entire path, achieves the desired frequency response.

In accordance with an embodiment of the present invention a method of designing a pre-compensation filter for a transmitter using Discrete Multitone (DMT) type modulation includes the steps of determining the inverse of the transfer function that needs to be compensated; truncating the inverse of this transfer function to be compensated to the region of interest; designing the desired band split component of pre-compensation filter; determining the target frequency response of the pre-compensation filter; and given the target frequency response Hermetian symmetry on the frequency response and then taking the inverse Fourier transform (IFFT) to generate a time domain filter.

In accordance with another embodiment of the present invention a method of providing an improved transfer function for a Discrete Multitone (DMT) type modulation transmitter such as an ADSL transmitter with digital filtering after modulation followed by digital to analog converter and analog filtering including the steps of sending a test signal to said transmitter and measuring the results of the test signal to determine the transfer function; determining the inverse of the transfer function that needs to be compensated; truncating the inverse of transfer function to be compensated to the region of interest; designing desired band split component of pre-compensation filter; determining the target frequency response of the pre-compensation filter; imposing Hermetian symmetry on its frequency response and then taking the inverse Fourier transform (IFFT) to generate a time domain filter, and providing the added characteristic of this filter at said digital filtering after modulation.

DESCRIPTION OF DRAWING

FIG. 5 illustrates the process steps according to one embodiment of the present invention.

FIG. 6 is a plot of magnitude of response in dB vs. frequency for steps 1–4 in a pre-compensation filter design.

DESCRIPTION OF PREFERRED EMBODIMENTS OF THE PRESENT INVENTION

Figure 2:
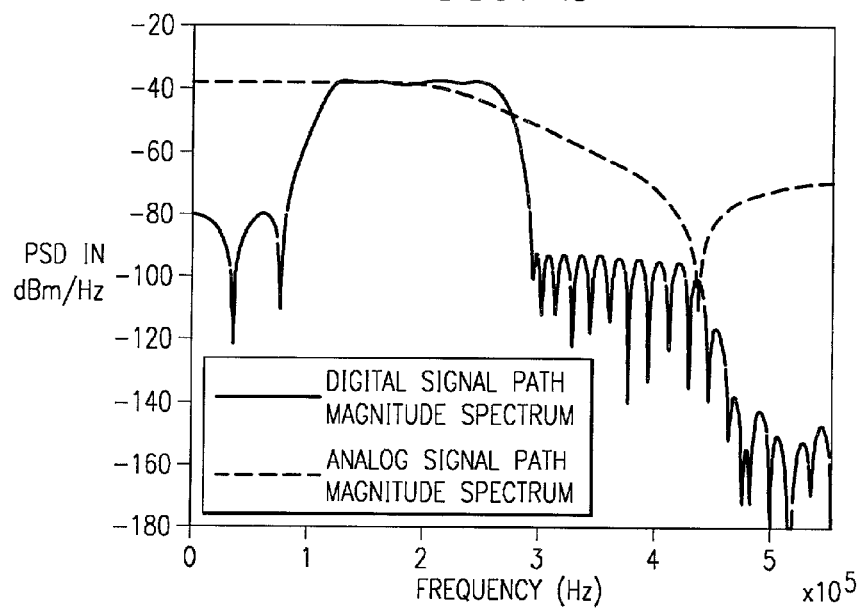
FIG. 2 is a plot of PSD vs. frequency illustrating the digital and analog filter magnitude spectrums.
Figure 3:
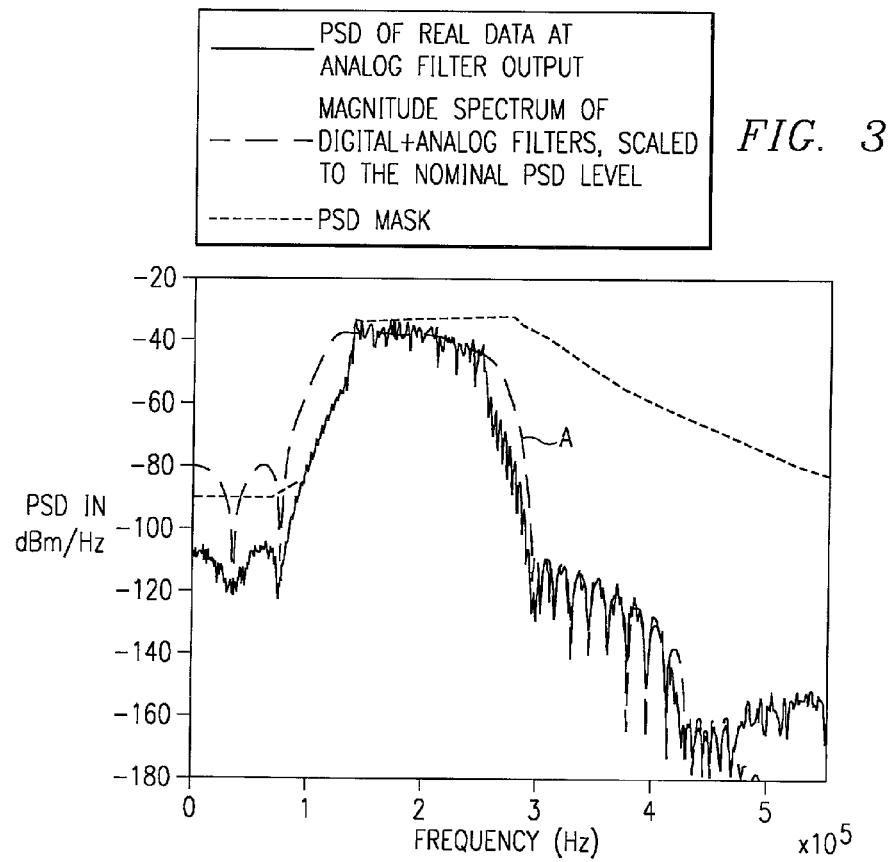
FIG. 3 is a plot of PSD vs. frequency illustrating the total signal path magnitude spectrum.

During system design it is often seen that significant savings in power and/or area can be achieved by reducing the amount of analog filtering in the codec. However such a reduction in analog filter order cannot be at the expense of reducing the attenuation requirement for the out-of-band transmit noise. One way to meet the attenuation requirement and reduce the analog filter order at the same time, is to allow the analog low pass filter to cut into the transmit band as shown in FIG. 2. However such a scheme results in a drop in the overall signal spectrum as shown by line A in FIG. 3. This obviously reduces upstream data rates and makes equalization more difficult for the receiving modem. A solution to this problem entails the use of a pre-compensation filter. The design methodology of such a pre-compensation filter is described herein.

Figure 4:
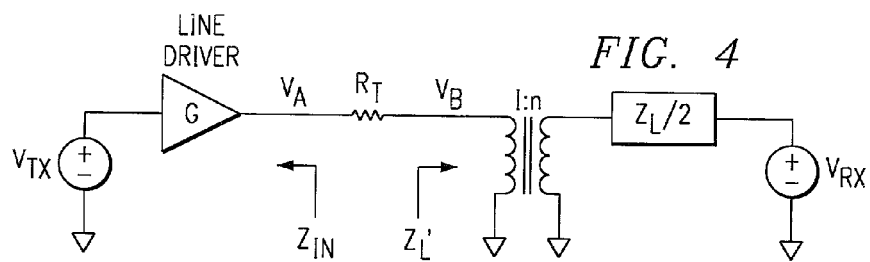
FIG. 4 the transmitter block diagram from the line driver to the tip and ring.

The problem of transmit distortion caused by line impedance mismatch can also be addressed by the digital compensation technique described herein. More specifically, as shown schematically in FIG. 4, the transmit transfer function from the line driver G to the tip-and-ring is given by $Z_L'/(R_T+Z_L')$. Where $R_T$ is the terminating impedance in a passive termination topology and $Z_L'$ is the reflected line impedance. Therefore, line impedance changes, which are common in real environments, directly affect the transmit frequency response as such; a technique that can pre-compensate for these changes is highly desirable.

In the design methodology of such a pre-compensation filter the goal of the pre-compensation filter is to offset the drop of the analog filter and also provide part of the required stop-band attenuation, in the example that follows 30 dB of attenuation is targeted in the pre-compensation filter. Additional details for this example which is targeted at the ADSL over ISDN system follows. The cutoff frequency is 276 kHz and the stop band should start at around 300 kHz. This FIR filter should have less than 1 dB pass-band ripple and should use a maximum of N taps. Referring to FIG. 5 this filter design technique uses a frequency domain design approach and involves the following steps.

Figure 1:
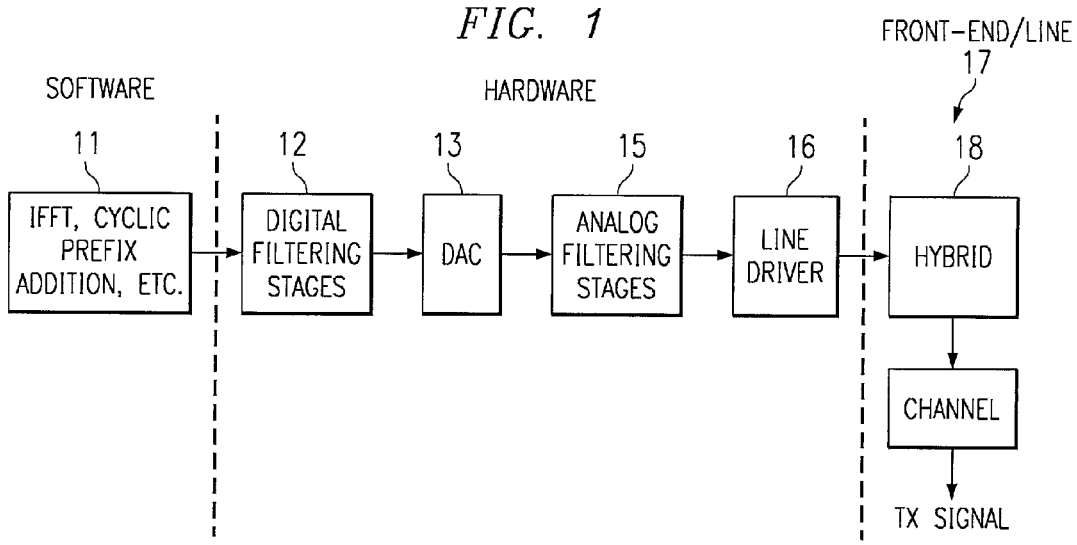
FIG. 1 illustrates ADSL transmitter architecture.

Step 1. Let G be the transfer function that needs to be compensated. In this case G is the transfer function of the analog filter shown in FIG. 1. Let $H_1=G^{-1}$ (inverse of the transfer function) as shown in FIG. 6 as represented by the [blue line] A which is at 0 dB out to about 200 kHz and then goes off the sheet at 40 dB. However since the analog transfer function has nulls in the stop band, it can be seen that $H_1$ tends to get very large in the stop band. Note that G may include the rest of the analog front-end (transformer, coupling capacitors, etc.) and thus this approach may be used to compensate for the overall transmit distortion including line impedance mismatch.

Step 2. Truncate $H_1$ to the region of interest as represented by the [red] dashed line B in FIG. 6. As this design is for an ADSL AnnexB (ADSL over ISDN) modem, the transmit band stops at 276 kHz. Hence $H_2$ is the equal to $H_1$ between 0 and 276 kHz and then forced to 0 dB.

Step 3. Design desired band split component of pre-compensation filter. The desired band split component of the pre-compensation filter is illustrated by response, $H_3$, in FIG. 6. This is represented by the [green] closely spaced dotted line C in FIG. 6 which stays on 0 dB and then drops off closer to 300 kHz to −60 dB.

Figure 7:
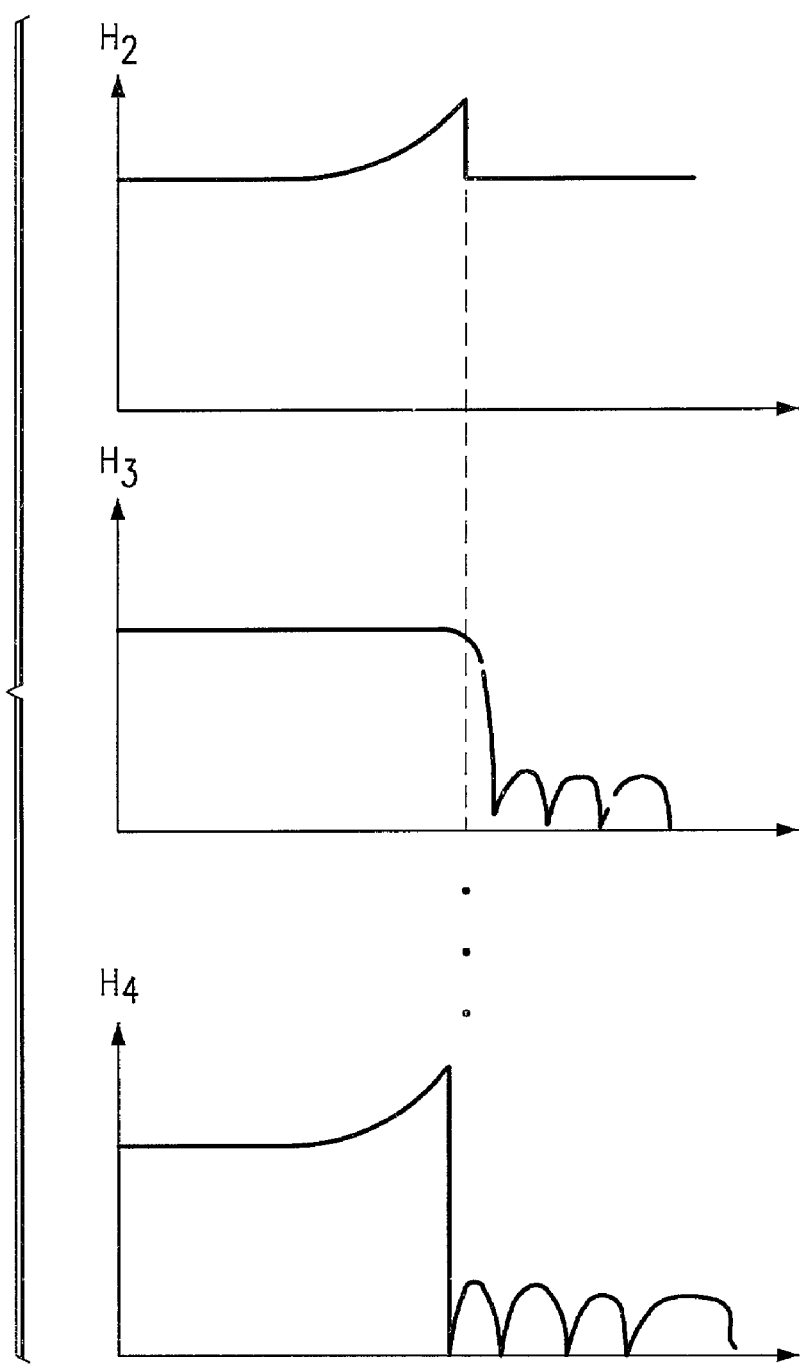
FIG. 7 is a sketch illustrating the multiplication step $H_4 = H_2 * H_3$.

Step 4. The target frequency response of the pre-compensation filter is given by $H_4=H_2*H_3$ where $H_4$ is the multiplication of $H_2$ and $H_3$. This multiplication is represented by the sketches in FIG. 7. The result is represented by the [black] widely spaced dotted line D in FIG. 6 that follows $H_1$ going above $H_3$ beyond 290 kHz and then drops to −60 dB with multiple bumps after 300 kHz.

Figure 8A:
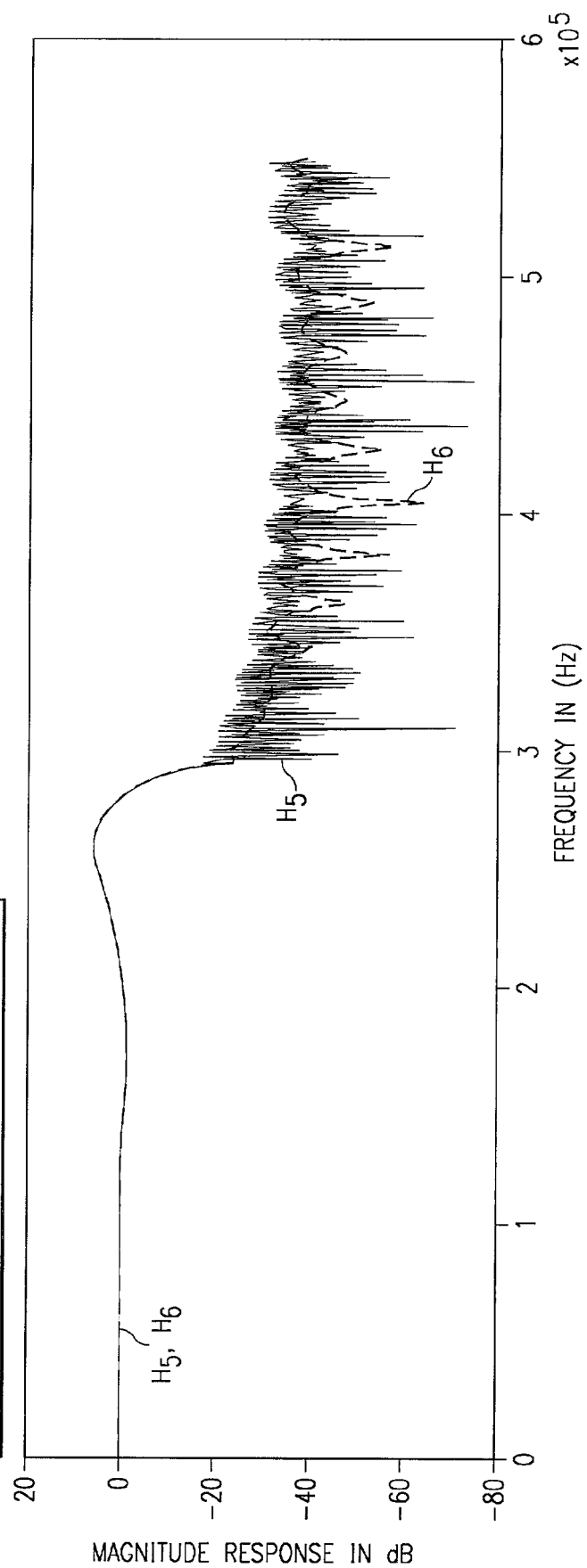
FIG. 8a illustrates magnitude vs. frequency for steps 5 and 6 for a pre-compensation filter design

Step 5. Given the target frequency response in $H_4$, the usual frequency-domain design procedure of imposing Hermetian symmetry on the frequency response and then taking the inverse Fourier transform (IFFT), can be used to generate a time domain filter, $h_5$, as shown in FIG. 8*a*. Hermetian symmetry may be represented by $Re[H(f)]=Re[H(-f)]$ for real part and $Im[H(f)]=-Im[H(-f)]$ for imaginary part. This is described in "Discrete—Time Signal Processing", by Alan V. Oppenheim, Ronald W. Schaeffer and John R. Buck, Prentice Hall, 1999. Note that a NFFT point IFFT is used to generate $h_5$ and hence it has $N_{FFT}$ ($N_{FFT}$=512) taps. The corresponding frequency response is also shown in FIG. 8*a*.

Figure 8B:
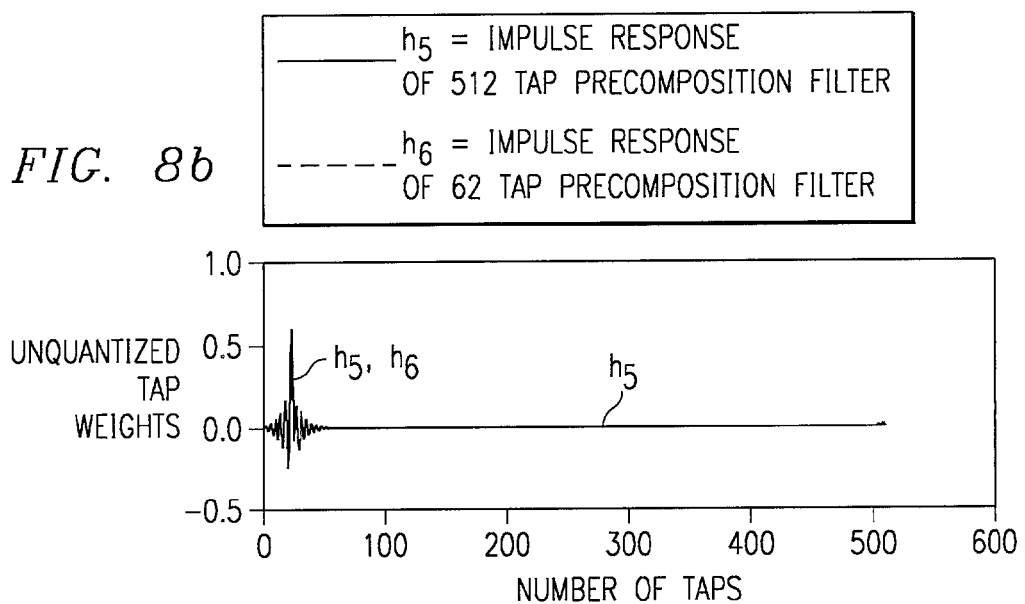
FIG. 8b is a plot of the pre-compensation filter impulse response before and after truncation to the N most significant coefficients.

Step 6. This filter is then truncated to retain only the most significant N taps (N<$N_{FFT}$), i.e. retain the circularly contiguous N taps, which have the highest energy. The resulting filter $h_6$, and its frequency response, $h_6$, are also shown in FIG. 8*b*. It has been seen that in this case $h_6$ contains 99.9% of the energy of $h_5$. Note that if the energies of $h_5$ and $h_6$ are not very close, then the filter requirements may have to be relaxed.

Step 7. Scale the filter coefficients to maintain a 0 dB total gain.

Figure 9:
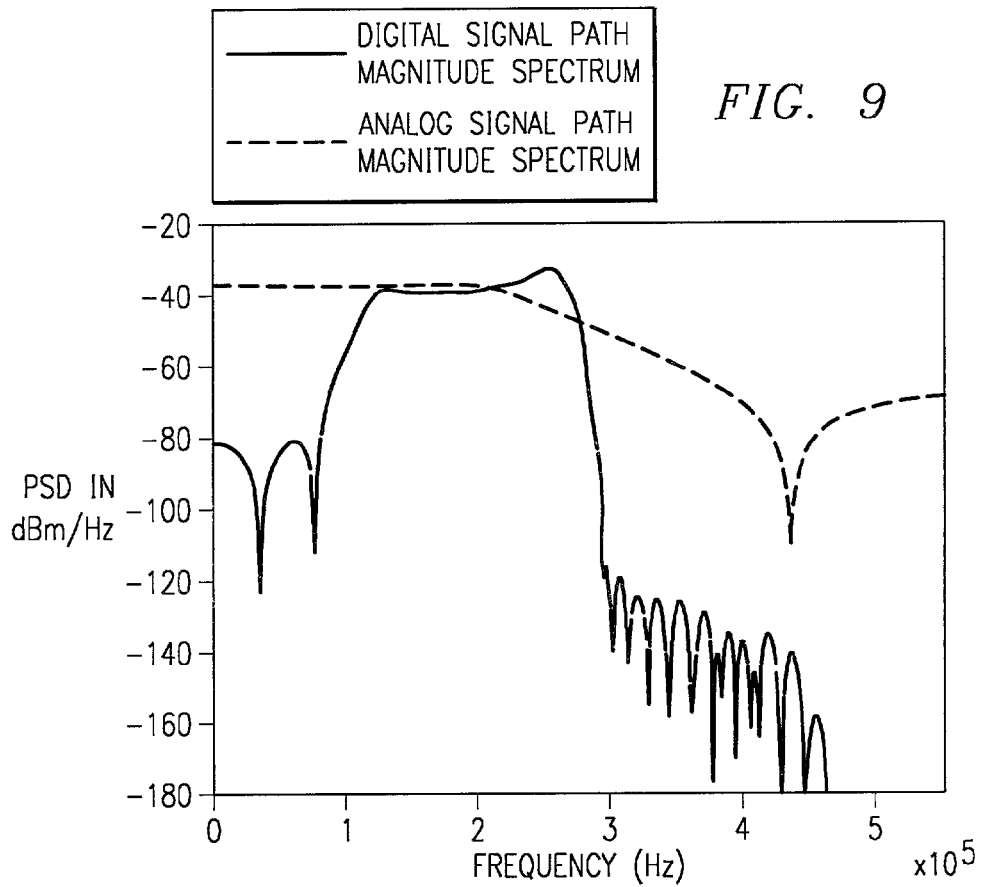
FIG. 9 is a plot of PSD vs. frequency for the resulting digital and analog filter responses.
Figure 10:
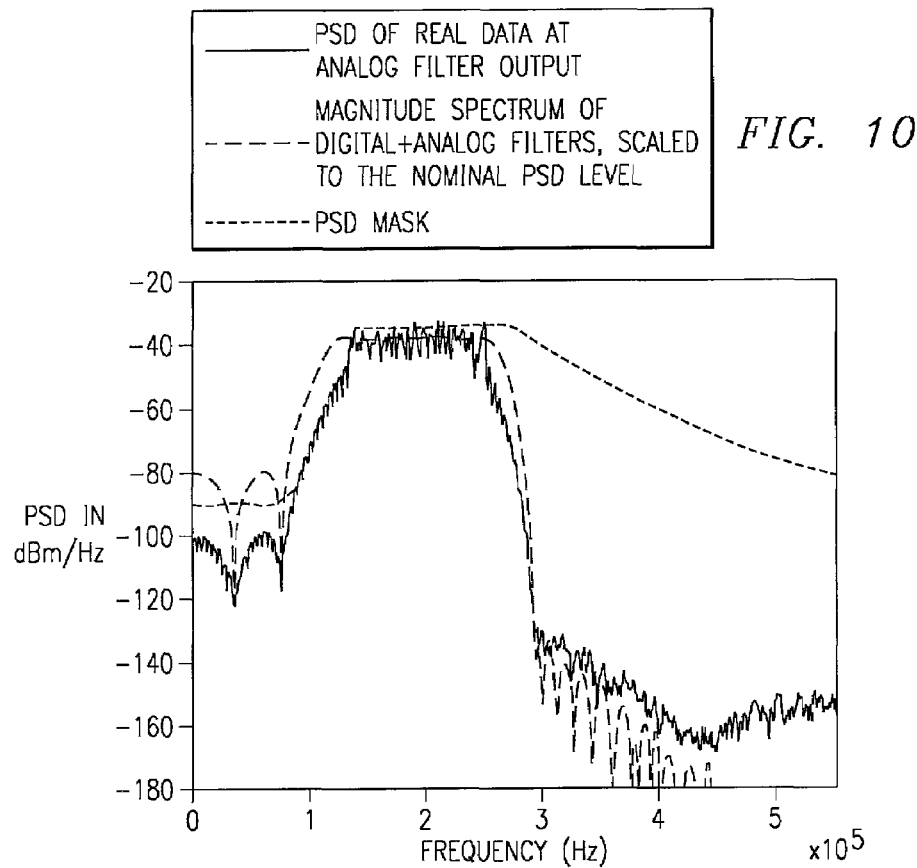
FIG. 10 is a plot of PSD vs. frequency for the overall signal spectrum.

Using the design methodology given above a 62-tap filter was designed for the given application. The resulting digital and analog filter responses are shown in FIG. 9. The overall signal spectrum is shown in FIG. 10. As can be seen from FIGS. 9 and 10, the digital filters now compensate for the drop in the analog filter response, so that the overall signal spectrum is flat in the pass-band.

The method according to the present invention may be used both off-line or on-line. The off-line method may be as described above where the a measurement taken results in the errors in the transfer function are determined such as by measuring the results at the output of the transmitter or by sending a test signal through the transmitter and a measurements taken and a digital pre-compensation filter is added at the front end of the digital filtering and before the DAC to make the correction or the digital filter configured to make the compensation.

Figure 11:
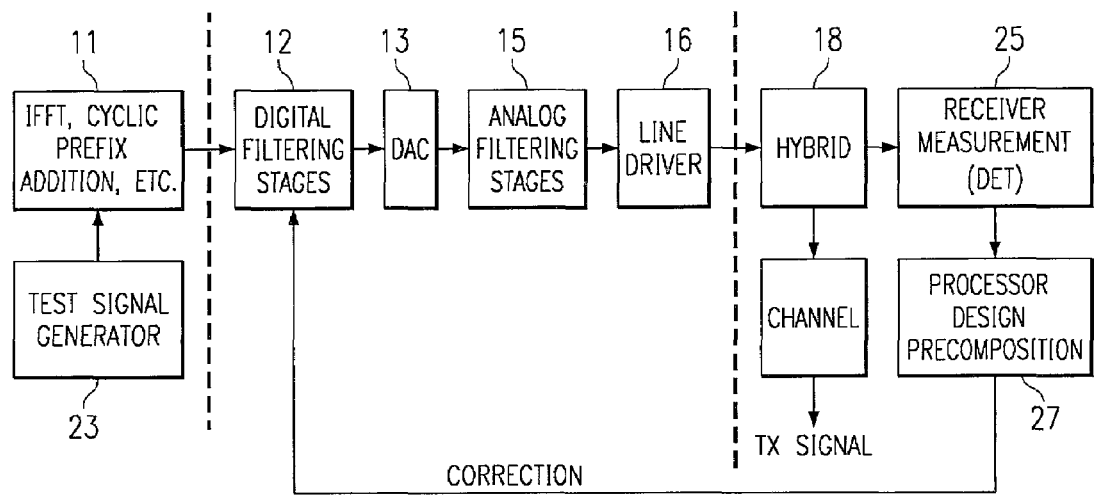
FIG. 11 illustrates an on-line system according to another embodiment of the present invention.

In the on-line system as illustrated in FIG. 11 the transmitter includes a means for correcting while in use and includes a test generator 23 or connection to a test generator and the test signal would be sent on a selective basis through the transmitter and the output of the test signal at an output connection point such as at the hybrid is taken and the pre-compensation filter value determined and the digital filtering after the modulation is configured to perform the pre-filtering. Thus, the pre-compensation filter corrects for the analog distortions, impedance mismatch and for process variations typical of integrated circuit (IC) solutions. A test generator 23 sends the test signal to said transmitter and a receiver 25 coupled to the output of the transmitter detects the results of the test signal to determine the transfer function. A processor 27 performs the operations of the flow chart of FIG. 5. The processor 27 determines the inverse of the transfer function that needs to be compensated (H1), truncates the inverse of transfer function to be compensated $H_1$ to the region of interest, designs desired band split component of pre-compensation filter ($H_3$) based on input from a user, determines the target frequency response of the a desired pre-compensation filter given by $H_4=H_2*H_3$ where $H_4$ is the multiplication of $H_2$ and $H_3$, given the target frequency response in $H_4$ imposes Hermetian symmetry on the frequency response and then takes the inverse Fourier transform (IFFT) to determine a time domain filter, $h_5$ characteristic to be added at the digital filtering 12. A signal representing this characteristic is fed back to said digital filtering 12 after modulation to add this transfer function to said digital filtering.

While the present application is described in connection with an ADSL system the method can be used with other transmitters using DMT modulation including Orthogonal Frequency Division Modulation (OFDM) Systems.

Although preferred embodiments have been described, it will be apparent to those skilled in the relevant art that various modifications, additions, substitutions and the like can be made without departing from the spirit of the invention and these are therefore considered to be within the scope of the invention as defined in the following claims.

The invention claimed is:

1. A method of designing a pre-compensation filter for a transmitter using Discrete Multitone (DMT) type modulation comprising the steps of:
   determining the inverse of the transfer function that needs to be compensated (H1);
   truncating the inverse of transfer function to be compensated $H_1$ to the region of interest (H2);
   designing desired band split component of pre-compensation filter ($H_3$);
   determining the target frequency response of the pre-compensation filter given by $H_4=H_2*H_3$ where $H_4$ is the multiplication of $H_2$ and $H_3$;
   given the target frequency response in $H_4$, imposing Hermetian symmetry on the frequency response and then taking the inverse Fourier transform (IFFT) to generate a time domain filter, $h_5$, wherein said $h_5$ has $N_{FFT}$ taps.

2. The method of claim 1 including the step of truncating the filter, $h_5$ to retain only the most significant N taps ($N<N_{FFT}$).

3. The method of claim 2 including the step of scaling the filter coefficients to maintain a 0 dB total gain.

4. The method of claim 1 including the step of scaling the filter coefficients to maintain a 0 dB total gain.

5. The method of claim 1 wherein said transfer function includes analog transfer function.

6. The method of claim 1 wherein said transfer function includes mismatch distortion.

7. The method of claim 1 wherein said transfer function includes process distortions.

8. The method of claim 1 wherein said transmitter is an Asymmetrical Digital Subscriber Lines (ADSL) transmitter with digital filtering after modulation followed by digital to analog converter and analog filtering and said transfer function includes analog transfer function.

9. The method of claim 8 wherein said transfer function includes mismatch distortion.

10. The method of claim 1 wherein said determining step includes the step of sending a test signal to said transmitter and measuring the results of the test signal to determine the transfer function to compensate for.

11. A method of providing an improved transfer function for a Discrete Multitone (DMT) type modulation transmitter with digital filtering after modulation followed by digital to analog converter and analog filtering comprising the steps of:
   sending a test signal to said transmitter and measuring the results of the test signal to determine the transfer function;
   determining the inverse of the transfer function that needs to be compensated (H1);
   truncating the inverse of transfer function to be compensated $H_1$ to the region of interest (H2);
   designing desired band split component of pre-compensation filter ($H_3$);
   determining the target frequency response of the pre-compensation filter given by $H_4=H_2*H_3$ where $H_4$ is the multiplication of $H_2$ and $H_3$,
   given the target frequency response in $H_4$ imposing Hermetian symmetry on the frequency response and then taking the inverse Fourier transform (IFFT) to generate a time domain filter, $h_5$, wherein said $h_5$ has $N_{FFT}$ taps, and
   providing the added characteristic of this filter at said digital filtering after modulation.

12. The method of claim 11 including the step of truncating the filter, $h_5$ to retain only the most significant N taps ($N<N_{FFT}$).

13. The method of claim 12 including the step of scaling the filter coefficients to maintain a 0 dB total gain.

14. The method of claim 11 including the step of scaling the filter coefficients to maintain a 0 dB total gain.

15. The method of claim 11 wherein said transfer function includes analog transfer function.

16. The method of claim 11 wherein said transfer function includes mismatch distortion.

17. The method of claim 11 wherein said transfer function includes process distortions.

18. The method of claim 11 wherein said transmitter is an Asymmetrical Digital Subscriber Lines (ADSL) transmitter.

19. An improved transfer function Discrete Multitone (DMT) type modulation transmitter with digital filtering after modulation followed by digital to analog converter and analog filtering comprising:
   means for sending a test signal to said transmitter and measuring the results of the test signal to determine the transfer function;
   means for determining the inverse of the transfer function that needs to be compensated (H1);
   means for truncating the inverse of transfer function to be compensated $H_1$ to the region of interest;
   means for designing desired band split component of pre-compensation filter ($H_3$);
   means for determining the target frequency response of the pre-compensation filter given by $H_4=H_2*H_3$ where $H_4$ is the multiplication of $H_2$ and $H_3$;
   means for imposing Hermetian symmetry on the frequency response and then taking the inverse Fourier transform (IFFT) to generate a time domain filter, $h_5$, given the target frequency response in $H_4$ and
   said digital filtering after modulation including added characteristic of said time domain filter.

* * * * *